Figures 3, 4:
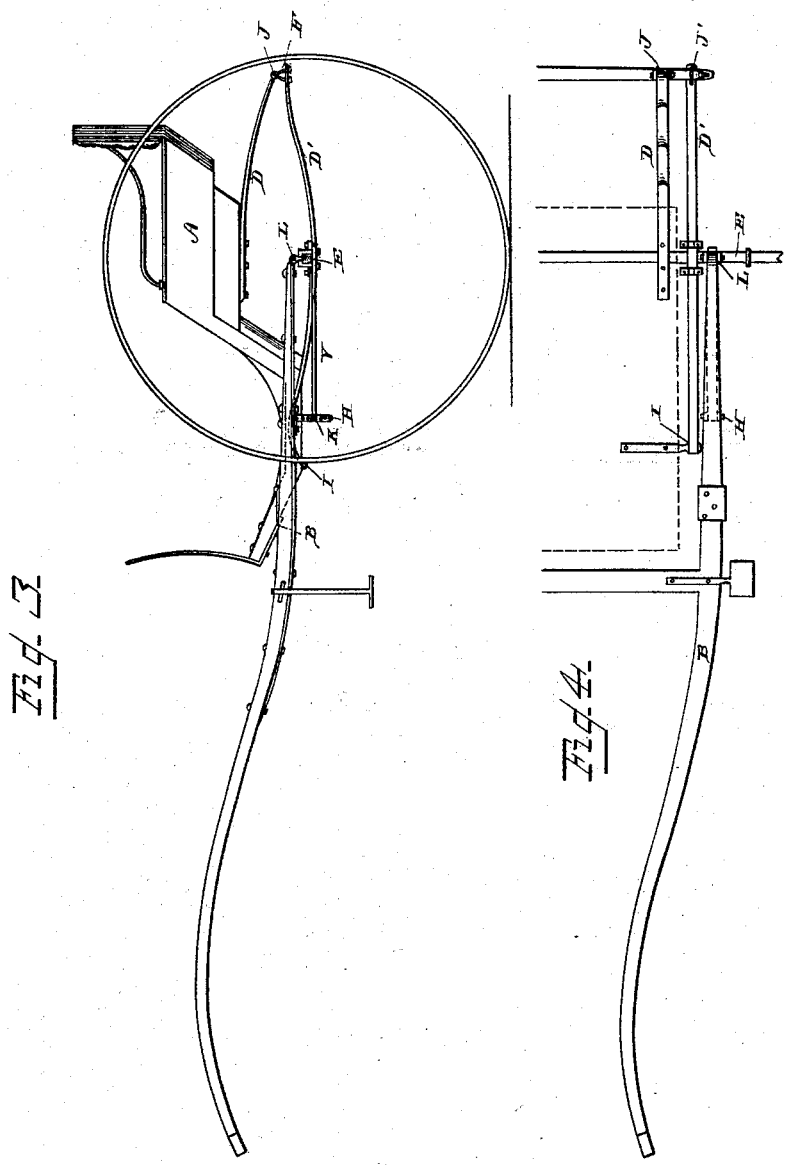

(No Model.)  3 Sheets—Sheet 1.
C. W. SALADEE.
TWO WHEELED VEHICLE.
No. 282,378. Patented July 31, 1883.
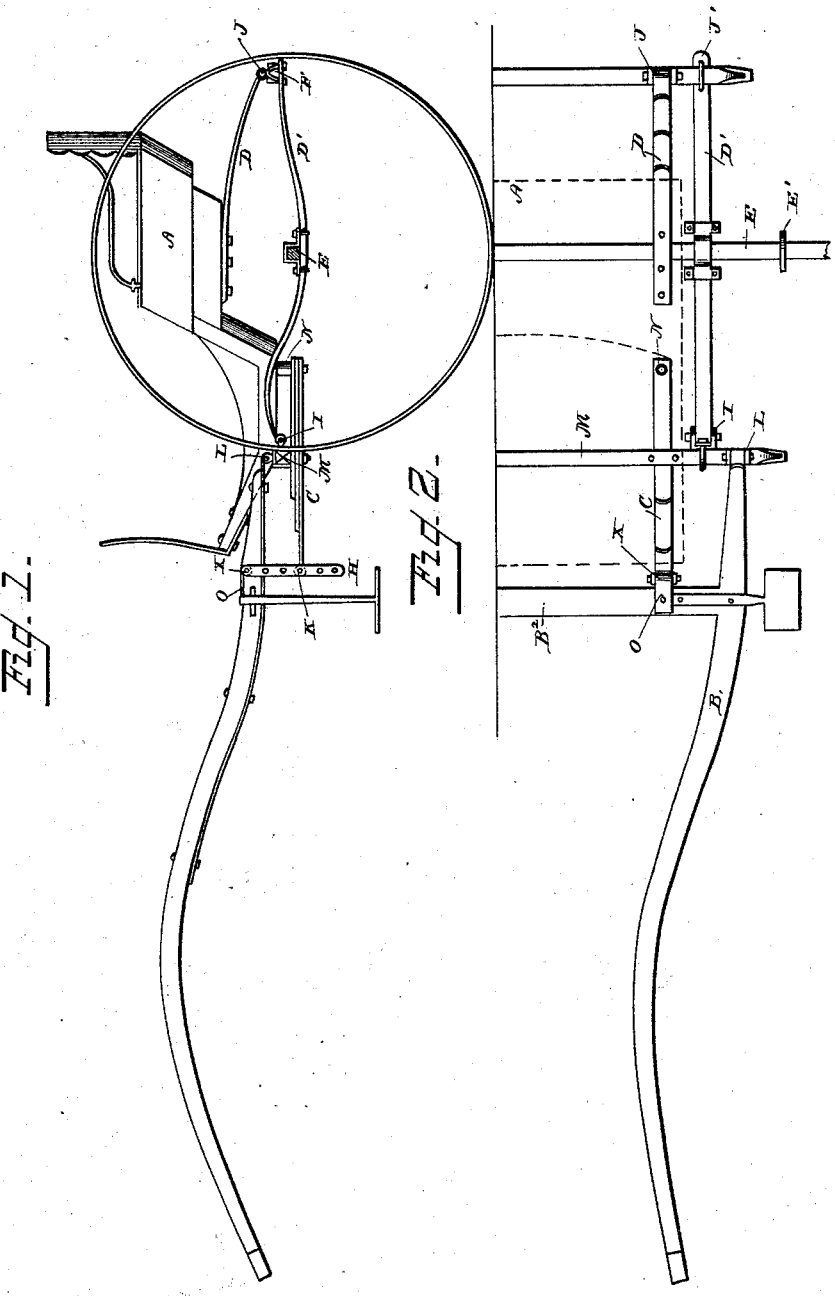
WITNESSES
INVENTOR (No Model.) 3 Sheets—Sheet 2.
C. W. SALADEE.
TWO WHEELED VEHICLE.

No. 282,378. Patented July 31, 1883.

WITNESSES
F. L. Ourand
A. G. Heylmun

INVENTOR
Cyrus W. Saladee
By Strut & Underwood
Attorneys (No Model.)  3 Sheets—Sheet 3.
C. W. SALADEE.
TWO WHEELED VEHICLE.
No. 282,378. Patented July 31, 1883.
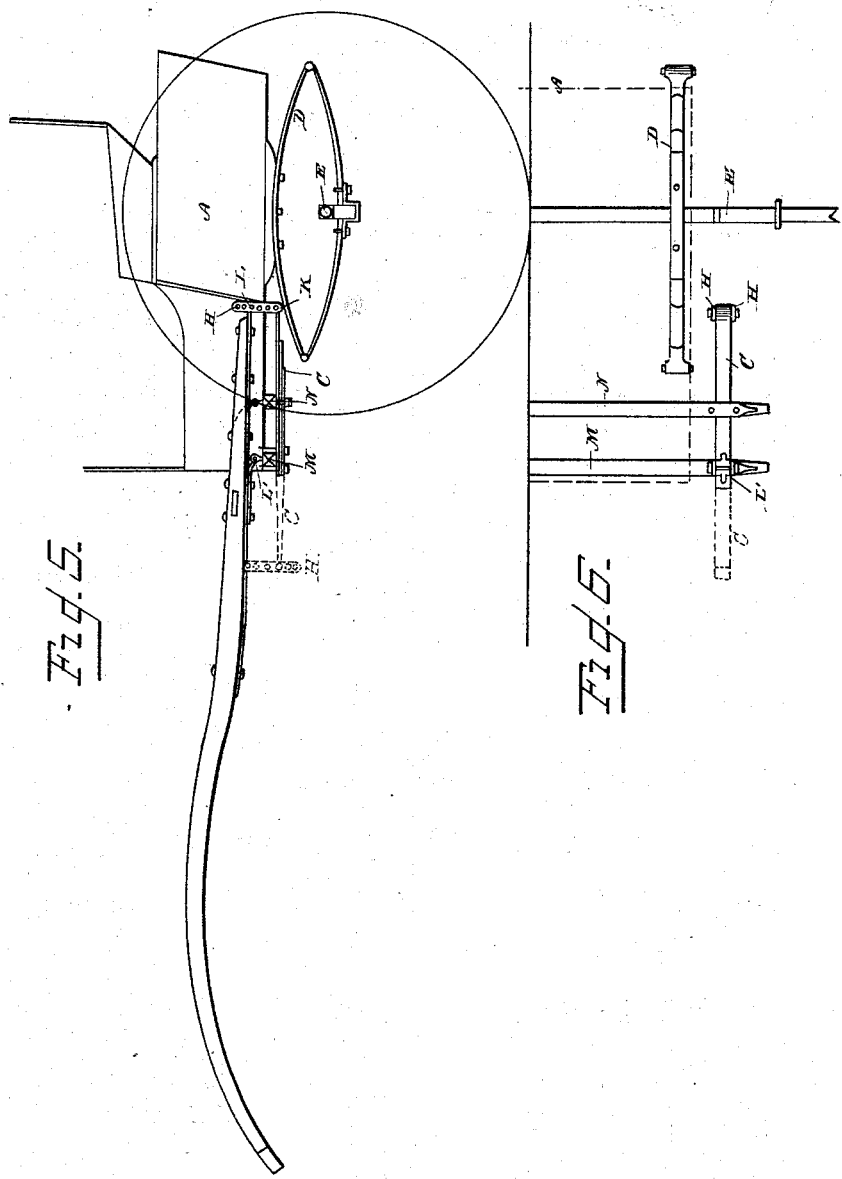
WITNESSES
F. L. Ouraud
A. G. Heylmun
INVENTOR
Cyrus W. Saladee
by Stint & Underwood
Attorneys

UNITED STATES PATENT OFFICE.

CYRUS W. SALADEE, OF TORRINGTON, CONNECTICUT.

TWO-WHEELED VEHICLE.

SPECIFICATION forming part of Letters Patent No. 282,378, dated July 31, 1883.

Application filed May 19, 1883. (No model.)

*To all whom it may concern:*

Be it known that I, CYRUS W. SALADEE, of Torrington, in the State of Connecticut, have invented certain new and useful Improvements in Road-Carts or Two-Wheeled Vehicles; and I do hereby declare that the following is a full, clear, and exact description thereof.

My invention relates to two-wheeled vehicles; and it consists in the attachment of shafts or pole thereto upon elastic bearings supported from the front end of the body or platform, in connection with an adjusting device adapted to regulate the "set" of the shafts or pole to carry the body level, as may be required when a tall or small horse or span is used, as also to prevent the transmission of the horse's motion to the body or seat.

My invention further consists in the combination, with the front end of the body, of one or more cross-bars extended beyond the sides of the body, and the same adapted to carry the rear ends of the shafts or pole and the front ends of the semi-elliptic side springs supporting the body; also, in other combination of parts pertaining to the platform supporting the body and the shafts or pole, as hereinafter fully set forth.

In the drawings, Figure 1 is a side elevation, and Fig. 2 a half plan view with body removed, of a complete two-wheeled vehicle embodying the main features of my invention. Figs. 3 and 4 represent the same combination of parts seen in Figs. 1 and 2, so far as relates to the spring-platform supporting the body, but showing a different mode of adjustably attaching the shafts to the vehicle, and which latter device I shall make the subject of a separate application for a patent. Fig. 5 is a side elevation, and Fig. 6 a half plan view, of a two-wheeled vehicle having a straight body and the latter supported upon elliptical springs, with the shafts secured to the front end of the body, substantially in the same manner seen in Figs. 1 and 2.

Referring to Figs. 1 and 2, the spring-platform is arranged to support a phaeton or "drop-front" body, and which consists in the employment of two semi-elliptic side springs, D', their center portions rigidly secured to the axle E, their front ends extended to unite with and support the drop-front of the body upon pivotal bearings I, secured to the cross-bar M, Figs. 1 and 2, or directly to the body, as in Figs. 3 and 4, and their rear ends extended back of the axle to rigidly unite with and carry the cross-bar F, connecting the rear ends of the side springs, as at J.

The elevated rear end of the body A connects to and is supported upon the cross-bar F by two springs or braces, D, the inner ends of which latter are rigidly connected to the body and their outer ends pivotally secured to the cross-bar F, as at J.

It will be understood that, as the rear ends of the springs D' are rigidly secured to the cross-bar F, the outer ends of the braces D must be pivotally connected thereto to admit of the free action of the springs; but it is obvious that the same result is had by reversing this arrangement and rigidly securing the outer ends of the braces D to the cross-bar F and pivotally connecting to the rear ends of the springs D'.

The shafts B have their rear ends shackled to a cross-bar, M; and connect with the spring-brace C by a hanger-link, H, suspended from the shafts, said link being provided with a series of holes which admit of raising or lowering the front end of the springs by a removal of the connecting-bolt from its present position (see Fig. 1) up or down, thereby regulating the set of the shafts to suit a tall or small horse and carry the body level. The rear or heavy ends of the shaft-springs C are secured to the bottom of the body, substantially as shown, and their free or elastic ends extended to connect with the hanger-link to the shafts or pole, thereby relieving the seat of the body from the motion of the horse or span.

For the purpose of my invention, the spring-platform may consist of semi-elliptic side springs, as in Figs. 1, 2, 3, and 4, or of elliptical springs, as seen in Figs. 5 and 6. In connection with phaeton or drop-front bodies, as in Figs. 1 and 3, the semi-elliptic side springs are preferable; but where a straight body is used, as in Fig. 5, the elliptical springs may be substituted; yet, if preferred, in both cases the side springs seen in Figs. 1 and 3 may be used for either style of body by a slight variation in the shape of the brace D, which connects the rear end of the body to the cross-bar F. In any style of body employed two cross-bars, M and N, Figs. 5 and 6, may be used, and to the outer ends of which the spring or brace c and the shafts or pole are secured, as already described.

I do not limit my claims to any particular style of body or kind of spring-platform supporting the same, for the obvious reason that it is equally applicable to all styles of bodies and spring-platforms adapted in two-wheeled vehicles; and, further, I do not desire to limit my claims to the longitudinal arrangement of the shaft-supporting springs c, as it is obvious that they may be arranged transversely to the front end of the body and connect to the shafts at opposite sides, as a single semi-elliptic cross-spring may be substituted for the ones seen in the drawings, to answer the same purpose.

What I claim as my invention, and desire to secure by Letters Patent, is—

1. In a two-wheeled vehicle, the shafts or pole pivotally attached upon elastic bearings supported from the front end of the body or platform, in combination with an adjusting device adapted to regulate the set of the shafts or pole and the "hang" of the body to carry it level, substantially as specified.

2. In a two-wheeled vehicle, the combination, with the front end of the body, of a cross-bar extended beyond the sides of the body, and adapted to receive and carry upon pivotal or shackle bearings the rear ends of the shaft or pole and the front ends of the semi-elliptic side springs supporting the body, substantially as specified.

3. In a two-wheeled vehicle, the combination, with the body and axle, of springs supporting the body, and one or more cross-bars secured to the bottom of the body or front, and adapted to carry the rear ends of the shafts or pole and means for adjusting the latter, substantially as specified.

In testimony that I claim the foregoing I have hereunto set my hand, on this the 10th day of May, 1883, in the presence of two witnesses.

CYRUS W. SALADEE.

Witnesses:
CHAS. L. McNEIL,
S. S. STOUT.